Jan. 27, 1970     M. M. LILLY     3,491,784
CONTROL APPARATUS FOR USE IN DISTRIBUTION SYSTEMS
Filed Aug. 26, 1966     2 Sheets-Sheet 1

Mason M. Lilly
INVENTOR

BY

ATTORNEY

Jan. 27, 1970          M. M. LILLY          3,491,784
CONTROL APPARATUS FOR USE IN DISTRIBUTION SYSTEMS
Filed Aug. 26, 1966          2 Sheets-Sheet 2
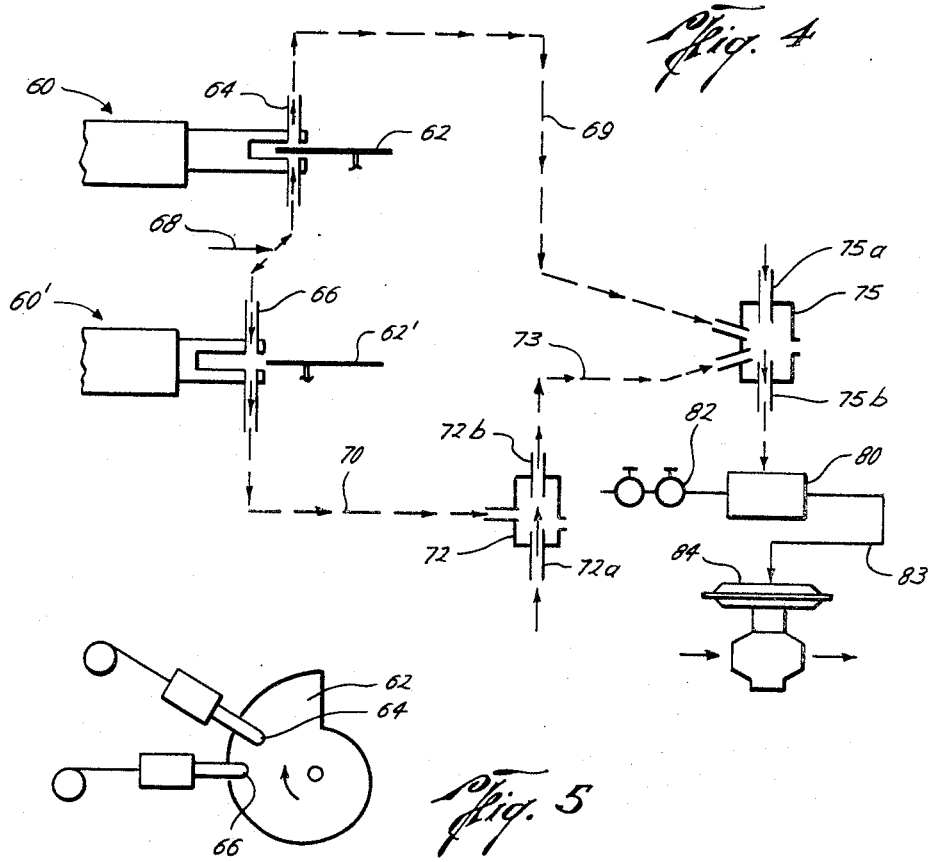
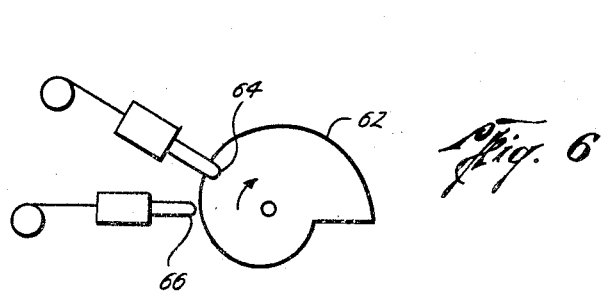
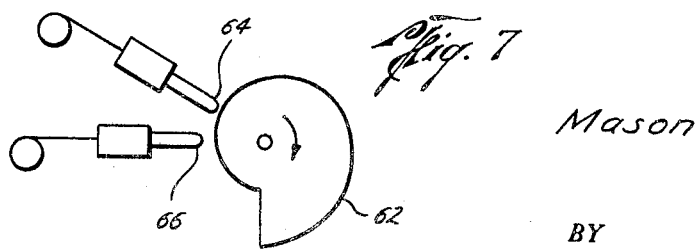
Mason M. Lilly
INVENTOR
BY
ATTORNEY

United States Patent Office 3,491,784
Patented Jan. 27, 1970

3,491,784
CONTROL APPARATUS FOR USE IN
DISTRIBUTION SYSTEMS
Mason M. Lilly, Houston, Tex., assignor to Harold
Brown Company, a corporation of Texas
Filed Aug. 26, 1966, Ser. No. 575,314
Int. Cl. F15c 1/14; G06d 1/02; G06m 1/12
U.S. Cl. 137—81.5                                    10 Claims

ABSTRACT OF THE DISCLOSURE

For use in fluidic control or logic systems, adjustable set-point apparatus converting a variable such as pressure, rate of flow, or the like, to a binary indication which includes a rotatable cam moved in response to the variable, a jet for directing air toward the cam, and an interruptable jet in line with the first jet and responsive to flow of air between the two jets in the absence of the cam and responsive to the presence of the cam to form two indications which represent the variable, and further wherein the cam is adjustable with respect to the jets to set the apparatus for desired trip points of operation.

---

This invention relates to a new and improved control apparatus, and more particularly relates to fluid control means for use with valves and other apparatus in distribution systems.

One object of the present invention is to provide a new and improved control apparatus converting variable functions to binary functions for fluid control logic.

Another object of the present invention is to provide new and improved controls for valved distribution systems operated within predetermined limits without chatter or oscillation at the set points of the limits.

An important object of the present invention is to provide control system apparatus having nonelectrical means for converting a variable function into a binary function useful in pilot valve operation and the like.

A related object of the present invention is to provide a new and improved bourdon tube device rotating a cam to provide set point conversion of the pressure variable input to the bourdon tube.

Other objects and advantages of the present invention will become more readily apparent after a consideration of the present specification and drawings wherein:

FIG. 4 is a hydraulic schematic illustrating the present invention controlling fluid pressure within predetermined limits; and FIGS. 5, 6, and 7 illustrate various operational conditions of the structure shown in FIG. 4.

Figure 1:
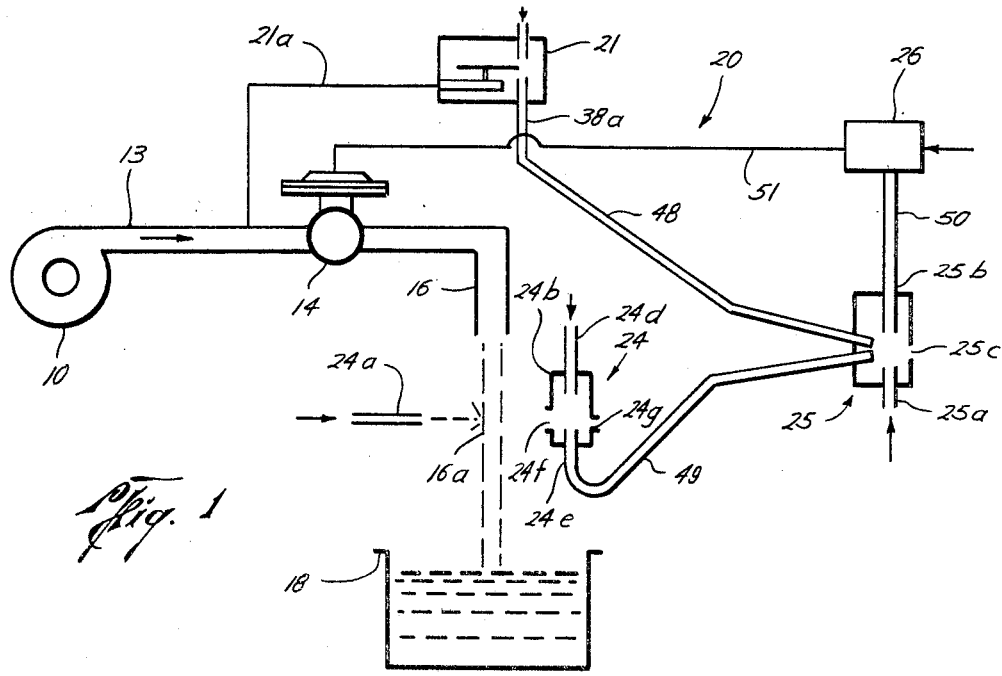
FIG. 1 is a hydraulic schematic illustrating the present invention and a fluid distribution system.

Attention is first directed to FIG. 1 which illustrates a fluid flow system including a pump 10. The pump 10 is represented generically and provides a flow of liquid within a conduit 13. The conduit 13 communicates with a valve 14 which is adapted to regulate flow through the conduit 13. A down spout 16 or other suitable outlet fills a liquid container or tank 18. The structure including the pump, the valve and outlet 16 is representative of a fluid distribution system wherein fluid delivered at a predetermined pressure through the conduit 13 is controlled by the valve 14. The valve 14 may completely close or only diminish flow through the pipe 13.

The present invention incorporates a fluid control system for relating fluid flow to the tank 18 and pressure in the conduit 13 to operation of the valve 14. The present invention is indicated generally at 20 and incorporates a means 21 for converting the continuously variable pressure in the conduit 13 to set point control whereby the variable of fluid pressure is converted to a binary signal. In addition, fluid flow is sensed through the outlet 16 by means indicated generally at 24. The means 24 incorporates a binary sensor which provides an output which, with the output from the means 20, enables system control.

The control circuit means 25 controls a pilot valve 26 communicated with the valve 14 for controlling same.

The flow sensor means 24 of the present invention incorporates an interruptable jet 24a having a supply of air from a source (not shown) directed through the fluid flow from the outlet 16. More particularly, FIG. 1 indicates the interruptable jet 24a positioned immediately adjacent to and directed at the flow 16a. Positioned in line with and on the opposite side of the fluid 16a is an air stream detector 24b. Air stream detector 24b has an inlet 24d from the supply (not shown) communicated with an outlet 24e. A port 24f permits the air from the interruptable jet 24a to enter the chamber of the detector means 24 to interrupt the fluid flow therein. Moreover, an additional port 24g on the opposite side of the detector means 24 enables the fluid flow to cross therethrough for interrupting fluid flow from the jet 24d.

The air stream detector means 24 utilizes continuous air flow from the source through the port 24e as an indication of the presence or absence of fluid flow through the outlet 16. The fluid flow 16a interrupts the air stream from the jet 24a to shield the inlet port 24f and prevent interruption of the air flow through the air stream detector 24. On the other hand, the absence of the stream of fluid interposed between the interruptable jet 24a and the air flow detector means 24 permits the jet of air extending from the jet 24a into the air stream detector means 24 to interrupt the flow between the inlet 24d and the outlet 24e. Air stream detector means 24 relies on laminar flow between the inlet and the outlet to form the continuous output signal. The jet of air from the jet 24a is sufficient to interrupt the laminar flow from the port 24d to the port 24e. The lateral jet of air diverts the quiescent jet of air from the port 24e, and the lack of air movement through the port 24e is a signal level output by the air stream detector means 24. Thus, it will be appreciated that the means 24 indicates the presence or absence of flow into the tank 18 and, moreover, in terms of binary logic, the function provided is a NOR function wherein flow in the hydraulic system is indicated by the absence of a signal output from the air stream detector means 24.

Figure 2:
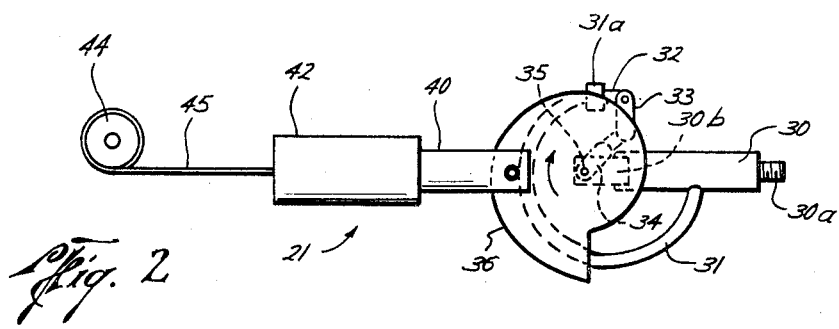
FIG. 2 is a plan view of means for converting a pressure indication to a binary signal.
Figure 3:
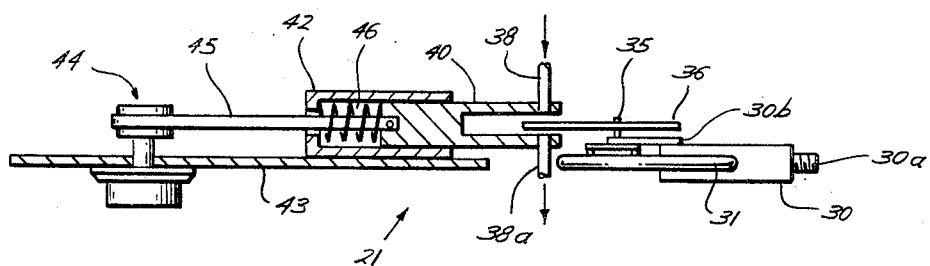
FIG. 3 is a side view of the structure shown in FIG. 2 including further details thereof.

Attention is next directed to the set point conversion means 21 previously noted. The means 21 utilizes a small diameter conduit or line 21a to obtain the pressure in the conduit 13. FIGS. 2 and 3 illustrate the set-point converter means 21 of the present invention. In FIGS. 2 and 3, the structure incorporates a bourdon tube 31 carried on a body 30 having an inlet port 30a for communication with the pilot line 21a. The bourdon tube 31 is curved to a closure member 31a which joins a connective link 32 joined by additional links 33 and 34 with a pivot member 35. Pivot member 35 is joined to position indicating means 36 which is preferably a cam. The opposite end of the pivot member 35 rotates relative to a support member 30b on the forward end of the body 30.

A word should be said about the cam 36. In the first instance, it is connected to the bourdon tube for rotation by the bourdon tube with an increase in pressure. The cam 36 may be described in a number of ways, and one mathematical description is that the cam is a linear device whereby a change in pressure is directly proportional to angular displacement of the cam. Moreover, as will be noted hereinafter, the indication of the cam 36 is reflected by the position of the outer edge or periphery of the cam 36 at a predetermined radius. Thus, the change in radial length is directly proportional to angular displacement.

An interruptable air jet 38 (FIG. 3) having air flow from a source (not shown) is mounted adjacent the cam 36. The interruptable jet 38 includes an outlet 38a positioned in line with the inlet by a mounting yoke 40. The inlet and outlet form a sensing gap to indicate location of the cam 36. Air flow through the interruptable jet 38 provides an output signal which is a function related to the set point provided by the present invention. The device of the present apparatus converts the continuous variable (pressure) to binary signal level indicative of pressure above and below a predetermined level.

The yoke 40 is movable to permit variations in set point control. Particularly, the yoke 40 is received within a slide assembly 42 mounted on a base plate 43. The slide assembly receives the yoke 40 for movement towards or away from the cam 36. Moreover, the mounting plate 43 carries an adjustment means 44 for positioning the yoke 40. The adjustment means 44 has a flexible metal band 45 connected to the rear of the yoke 40. A helical spring 46 which is received within the slide mounting 42 urges the yoke 40 towards the cam 36. The flexible metal band 45 pulls the yoke in the opposite direction. The adjustment means 44 incorporates a rotatable knob or the like which is positioned and locked after adjusting the length of the flexible metal band 45.

Attention is directed to FIG. 1 for consideration of the set point conversion means 21 in the context of the present invention. The fluidic control means of the present invention utilizes the output of the set point conversion means 21 provided through a conduit 48 to the turbulence amplifier 25. The air stream detector means 24 utilizes the conductor 49 to communicate its output to the turbulence amplifier means 25.

Turbulence amplifier 25 is provided with a quiescent input by the jet 25a which directs a stream of air flow to the port 25b. The turbulence amplifier is connected to conduits 48 and 49 which point toward an outlet port 25c. Port 25c is positioned in the line of flow from the two inputs. A signal (air flow) in either of the conductors 48 or 49 interrupts the quiescent flow through the turbulence amplifier means 25. Moreover, the turbulence amplifier 25 provides a fluidic NOR function communicated through a conduit 50 to the pilot valve 26. Since the turbulence amplifier 25 has an output with no inputs, and it being recalled that devices 21 and 24 are also NOR devices, an indication representing both high pressure in the conduit 13 and the absence of flow from outlet 16 signals the three-way pilot valve 26.

The pilot valve 26 amplifies the level of the signal in the conductor 50. The output of the pilot valve is communicated through a conduit 51 to the valve 14 to regulate the valve 14 in a predetermined manner. Since the exact nature of the valve 14 was not indicated, it will be appreciated that the valve 14 can be a pressure regulator valve, an off-on valve, or other selected valves. At any event, the apparatus utilizes the pilot valve 26 to provide a proper operational level for the device of the present invention.

The air stream detector means 24 and the pressure conversion means 21 preferably operate with air pressures in the range of three to fifteen inches of water. The devices drop the pressure in the conduits 48 and 49 to substantially zero gauge pressure. The two levels of pressure are approximately zero pressure and a higher value of, say, twelve inches of water. In both devices 21 and 24, the solid cam and the down flow 16a fully interrupt flow to form the necessary pressure drop in the output. At the turbulence amplifier 25, the air flow signals in the conduits 48 and 49 are adequate to interrupt flow through the turbulence amplifier means 25. The turbulence amplifier 25 also uses a source pressure of perhaps three to fifteen inches of water. The turbulence amplifier is sensitive to a small jet of air and it will be appreciated that the conduits 48 and 49 provide signal levels which actually overdrive the device to provide a design margin for the amplifier means 25.

Attention is next directed to FIG. 4, an illustration of control apparatus maintaining a pressure within a predetermined range. The hydraulic schematic in FIG. 4 incorporates pressure conversion means indicated at 60. In addition, a second conversion means is indicated at 60'. The devices incorporate cams indicated at 62 and 62'. The duplicate means 60 and 60' are preferably combined into one structure whereby only one device 60 is required and operates the cam 62 associated therewith. To obtain two set points, reference is made briefly to FIG. 5 which illustrates the cam 62 and two interruptable jets for converting the continuous variable (pressure) to binary signals. Referring again to FIG. 4, set-point control for the high and low pressure levels determines the range of pressure sensed by the means 60. In this respect, the structure of FIG. 5 illustrates a pair of interruptable jets angularly displaced about the cam 62.

Referring gain to FIG. 4, and recognizing that the two means can be one, the devices incorporate an interruptable jet 64 which is the high pressure set point. An interruptable jet 66 is a low pressure set point. Both jets 64 and 66 are driven from a single source indicated schematically at 68.

The output of the interruptable jet 64 is comunicated through a conduit schematically represented at 69. In like manner, interruptable jet 66 communicates through a conduit 70. The interruptable jet 66 provides an output signal which is inverted by turbulence amplifier means 72. The inverter means 72 is provided with an inlet jet 72a communicating with an outlet conduit 72b whereby the signal input on the conductor 70 is inverted in the turbulence amplifier means 72. The amplifier means 72 provides a NOR logic function whereby the output is present if there is no input. The output is communicated by the conduit 73 as one of two inputs to a turbulence amplifier means 75. The means 75, an inlet port 75a, and the inputs 69 and 73 are positioned to interrupt continuous flow through the turbulence amplifier 75. Turbulence amplifier means 75 incorporates the outlet port 75b which communicates with a pilot valve 80. Pilot valve 80 has a regulated input from a means indicated at 82 and has an output conduit 83 connected to a valve 84. The valve 84 is a pressure regulator valve responsive to the apparatus of the present invention. While the valve 84 is shown without the appropriate connections, it will be understood that the input to the pressure conversion means 60 is related to flow through the valve 84.

The fluid control apparatus of FIG. 4 maintains fluid pressure within predetermined limits. The system provides a first binary signal which is related to a predetermined low pressure setting. The system forms a second binary signal related to the predetermined high pressure setting, the two levels defining the permissive range of pressure variations. The apparatus shown in FIG. 4 incorporates fluid circuit control means responsive to the first and second binary signals if the pressure is in the range determined by the high and low pressure limits for the fluid transfer system. The output is a binary signal communicated to pilot valve 80. The valve 80 is a pilot valve for the valve 84 and opens the valve 84 when the pressure is within the predetermined limits. The set point control of the conversion means 60 is best understood by considering the cam and jets illustrated in FIGS. 5, 6 and 7.

Only the cam 62 is shown with the set point means represented schematically to indicate its position. The arrows in FIGS. 5–7 indicate the direction of rotation with increasing pressure.

In FIG. 6, the interruptable jet 64 is shown in a position whereby the cam 62 interferes with the quiescent fluid flow. On the other hand, FIG. 6 illustrates that the fluidic jet 66 continues to operate because the cam 62 has been withdrawn from the sensory gap by rotation of the device. This provides an indication that the pressure in the bourdon tube rotating the cam 62 is within the predetermined limits. For an understanding of this, attention is redirected to FIG. 4. In FIG. 4, the cam 62 interrupts the interruptable jet 64 and the signal is supplied to the turbulence amplifier 75. The open gap in the jet 66 (see FIG. 6) permits a steady flow through the jet 66 to the conduit 70 and thence to the NOT logic circuit element 72. The signal input to the turbulence amplifier 72 is inverted and a zero output signal is provided in the conduit 72. The conduits 69 and 73 both input zero signal levels to the turbulence amplifier 75. The zero signals are the absence of air movement, and the amplifier 75 output a signal to the pilot valve 80 indicating pressure within the predetermined limits.

Consider for example a pressure range of 50 to 100 p.s.i.g. communicated with the bourdon tube which operates the fluidic pressure control conversion means of the present invention. When the pressure exceeds the upper limit, the bourdon tube responds thereto in the conventional manner and rotates the cam sufficiently to clear the gap in the detector jet 64. Reference is made to FIG. 7 which illustrates both means 64 and 66 beyond the cam 62. The position of the cam 62 permits continued fluidic signal levels in both fluidic conductors 69 and 70. Attention is directed to FIG. 4 wherein it is noted that the conductor 69 communicates the fluidic signal to turbulence amplifier 75. Inputting the fluid flow to turbulence amplifier 75 interdicts the fluid flow therethrough and the output signal is zero flow at the output port 75b. This is communicated to the pilot valve 80 in the form of a signal indicating that the pressure sensed by the present invention is outside the predetermined limits, and in this case, the pressure is too high.

Attention is also directed to FIG. 5 of the present drawings. In FIG. 5, the cam 62 is shown interrupting flow through the jets 64 and 66. A zero level signal in the jet 64 is communicated through the conduit 69 to the turbulence amplifier 75. The zero input permits continuation of the flow from the turbulence amplifier 75 as described above. However, the jet 66 is interrupted and the signal is inverted by the NOR circuit element 72 to continue flow through the conduit 73. The input to the turbulence amplifier 75 interrupts its output and provides zero output so long as the cam 62 is positioned as shown in FIG. 5. This indicates to the valve 80 that the pressure is outside the limits previously determined, and it should be noted that the pressure is too low.

The structures shown in FIGS. 5, 6, and 7 are adjustable to set the predetermined limits of operation. For instance, attention is redirected to the structure more adequately shown in FIGS. 2 and 3 whereby the physical location of the interruptable jet is adjustable with respect to the cam 62. Movement away from the cam increases the pressure required to rotate the cam to a point interrupting the jet. Both jets 64 and 66 can be moved to various positions depending on the predetermined range.

Of course, additional jets can be positioned about the cam 62 as desired for other purposes. This is left to the choice of the designer. The apparatus shown in the drawings of the present invention can be used for sensing other functions, and by way of example, the structure in FIG. 4 can be used to sense temperature. Substitution of a liquid filled device in place of the bourdon tube will provide a means whereby temperature is converted to set point indications in the form of binary signal levels. Also, diaphragms, bellows, and helical tubes of all sorts can convert the parameter to motion and these devices are well known in the art.

The fluidic control means of the present invention incorporates devices available in the open market from many manufacturers. Generally, the pressure flow can be air though other fluid sources can be used. Moreover, the conventional range is approximately three to fifteen p.s.i.g. The amplifier 25 shown in FIG. 1 and the means 75 shown in FIG. 4 are quite substantially overdriven to provide a substantial margin for errors in operation.

The foregoing disclosure is representative of the present invention and is directed to the preferred embodiment thereof; the scope of the present invention is defined by the attached claims.

What is claimed is:
1. A fluidic device comprising:
 (a) a bourdon tube device responsive to pressure variations adapted to be communicated with a variable source;
 (b) means operably associated with said bourdon tube device for converting the variable to a positional indication;
  (b1) said positional means being responsively connected with said bourdon tube device and arranged relative to said fluidic flow means to interrupt the flow thereof on movement of said bourdon tube device, said positional means interrupting the quiescent fluid flow at a predetermined pressure level; and
 (c) fluidic flow means positioned relative to said means for sensing the positional indication thereof and for converting same to a fluidic flow signal.
2. The invention of claim 1 including a second fluidic flow means arranged relative to the first fluidic flow means to provide a second fluidic signal, said signals each being related to a selected value of the variable input to said variable responsive means.
3. The invention of claim 1 wherein said positional means is a rotatable cam, and said fluidic flow means is an interruptable jet positioned for interruption by said cam.
4. The invention of claim 1 including means for adjusting the position of said fluidic flow means relative to said positional means to vary the positional indication operating said fluidic flow means, and wherein said fluidic flow means provides a binary fluidic signal.
5. A control system for use with and responsive to a fluid transfer system responding to pressure within the system, comprising:
 (a) means for sensing the pressure to be controlled and for converting the pressure to a first binary signal related to a predetermined pressure level;
 (b) said means including a bourdon tube device responsive to pressure variations by variations in position;
 (c) fluidic flow means maintaining a quiescent fluid flow;
 (d) positional means responsively communicated with said bourdon tube device and arranged relative to said fluidic flow means to interrupt the flow thereof on movement of said bourdon tube device, said means interrupting the quiescent flow at a predetermined level to form the binary signal;
 (e) second means for sensing the pressure and for converting the pressure to a second binary signal related to a second predetermined pressure level;
 (f) said second means including means for converting the variations in pressure to variations in position;
 (g) fluidic flow means maintaining a quiescent fluid flow;
 (h) positional means cooperatively related to said converting means and arranged relative to said fluidic flow means to interrupt the flow thereof in response to pressure variations by said converting means to form the second binary signal; and,
 (i) said first and second predetermined pressure levels providing a range of pressures for the fluid transfer system.
6. The invention of claim 5 including:
 (a) control means in the fluid transfer system for reg- ulating one of the parameters of operation of the fluid transfer system;

(b) means for communicating the binary levels in the fluidic signal from said fluid circuit means to said control means; and (c) said control means altering the controlled parameter of the fluid transfer system in response to the binary levels in the fluidic signal.

7. The invention of claim 6 wherein:

(a) said control means is a flow valve having open and closed positions; and (b) said communicating means includes fluidic amplifier means interposed between said fluid circuit means and said flow valve for providing control signals of a predetermined level to said flow valve for operation thereof.

8. The invention of claim 6 wherein:

(a) said fluid circuit means is a NOR device having two or more inputs; and (b) said communicating means includes a pilot valve having its output communicated to said control means.

9. The invention of claim 5 including a pair of fluidic flow means arranged relative to said positional means wherein the interruption of the quiescent fluid flow of both corresponds to the range of pressures.

10. A control system for use with and responsive to a fluid transfer system responding to pressure within the system, comprising:

(a) means for sensing the pressure to be controlled and for converting the pressure to a first binary signal related to a predetermined pressure level;

(b) said means including means for converting the variations in pressure to variations in position;

(c) fluidic flow means maintaining a quiescent fluid flow;

(d) positional means cooperatively related to said converting means and arranged relative to said fluidic flow means to interrupt the flow thereof in response to pressure variations by said converting means to form the binary signal;

(d1) said positional means including a rotatable cam operably connected to bourdon tube means for converting the pressure in the fluid transfer system to variations in position of said cam, said fluidic flow means being located for interruption by said cam;

(e) second means for sensing the pressure for converting the pressure to a second binary signal related to a second predetermined pressure level;

(f) said second means including means for converting the variations in pressure to variations in position;

(g) fluidic flow means maintaining a quiescent fluid flow;

(h) positional means cooperatively related to said converting means and arranged relative to said fluidic flow means to interrupt the flow thereof in response to pressure variations by said converting means to form the second binary signal; and (i) said first and second predetermined pressure levels providing a range of pressure for the fluid transfer system.

References Cited

UNITED STATES PATENTS

| | | | |
|---|---|---|---|
| 2,231,696 | 2/1941 | Wolfe | 137—484.4 |
| 3,107,850 | 10/1963 | Warren et al. | 137—81.5 XR |
| 3,234,955 | 2/1966 | Auger | 137—81.5 |
| 3,266,513 | 8/1966 | Voit | 137—81.5 |
| 3,292,648 | 12/1966 | Colston | 137—81.5 XR |
| 3,266,379 | 8/1966 | Kreuter | 251—251 XR |
| 3,324,730 | 6/1967 | Bowles | 137—81.5 XR |
| 3,340,885 | 9/1967 | Bauer | 137—81.5 |
| 3,378,022 | 4/1968 | Sorenson | 137—81.5 |
| 3,395,719 | 8/1968 | Boothe et al. | 137—81.5 XR |
| 3,404,701 | 10/1968 | Shiiki | 137—81.5 |

SAMUEL SCOTT, Primary Examiner

U.S. Cl. X.R.

235—201